United States Patent
Lopez et al.

(10) Patent No.: US 12,388,694 B2
(45) Date of Patent: Aug. 12, 2025

(54) TRANSMISSION AND RECEPTION OF A PHYSICAL LAYER PACKET WITH MIDAMBLES

(71) Applicant: Telefonaktiebolaget LM Ericsson (publ), Stockholm (SE)

(72) Inventors: Miguel Lopez, Solna (SE); Leif Wilhelmsson, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/735,349

(22) Filed: Jun. 6, 2024

(65) Prior Publication Data
US 2024/0323068 A1    Sep. 26, 2024

Related U.S. Application Data

(63) Continuation of application No. 17/911,951, filed as application No. PCT/EP2020/057456 on Mar. 18, 2020, now Pat. No. 12,047,212.

(51) Int. Cl.
    *H04L 27/26*      (2006.01)
    *H04B 7/0413*      (2017.01)
    *H04L 25/02*      (2006.01)

(52) U.S. Cl.
    CPC ....... *H04L 27/2602* (2013.01); *H04B 7/0413* (2013.01); *H04L 25/0202* (2013.01)

(58) Field of Classification Search
    CPC .............. H04B 7/0413; H04L 25/0202; H04L 25/0226; H04L 25/03866; H04L 27/2602
    See application file for complete search history.

(56) References Cited

U.S. PATENT DOCUMENTS 8,462,863 B1 *   6/2013   Zhang ................ H04L 27/2613
                                                                                                      375/285
2005/0153721 A1     7/2005   Chang
(Continued)

FOREIGN PATENT DOCUMENTS

CN          103227759 A     7/2013
EP            1300999 A1     4/2003
(Continued)

OTHER PUBLICATIONS

Chinese Notice of Allowance, Chinese Patent Application No. 202080098694.0, mailed Aug. 30, 2024, 4 pages.
(Continued)

*Primary Examiner* — Khanh C Tran
(74) *Attorney, Agent, or Firm* — Sage Patent Group

(57) ABSTRACT

A method is disclosed of a transmitter configured to transmit a physical layer packet having a plurality of midambles. The method comprises applying a respective phase shift for each midamble of the physical layer packet, and transmitting the physical layer packet. The respective phase shift is applied to at least a portion of symbols of the midamble.

A method is also disclosed of a receiver configured to receive a physical layer packet having a plurality of midambles. The method comprises receiving the physical layer packet, and counteracting a respective phase shift for each midamble of the physical layer packet. Counteracting the respective phase shift comprises applying an opposite of the respective phase shift to at least a portion of symbols of the midamble or compensating the respective phase shift for at least a portion of symbols of the midamble.

22 Claims, 4 Drawing Sheets

(56) References Cited

U.S. PATENT DOCUMENTS

| | | | |
|---|---|---|---|
| 2007/0133611 A1 | 6/2007 | Li et al. | |
| 2008/0039030 A1* | 2/2008 | Khan | H04B 7/0617 |
| | | | 455/101 |
| 2017/0078052 A1 | 3/2017 | Matsuo et al. | |
| 2017/0279640 A1* | 9/2017 | Yang | H04L 1/0003 |
| 2019/0173710 A1 | 6/2019 | Cao et al. | |

FOREIGN PATENT DOCUMENTS

| | | | |
|---|---|---|---|
| JP | 2007-525097 A | 8/2007 | |
| JP | 2019-515585 A | 6/2019 | |
| WO | 03098828 A1 | 11/2003 | |
| WO | 2010/139095 A | 12/2010 | |

OTHER PUBLICATIONS

International Search Report and Written Opinion of the International Searching Authority for PCT International Application No. PCT/EP2020/057456 dated Nov. 26, 2020.

Lopez et al., "Remark on PPDUs with midambles," doc.: IEEE 802.11-20/0476r0, Mar. 2020, 9 pages.

Shellhammer et al., "WUR Power Spectral Density," doc.: IEEE 802.11-18/0824r1, May 2018, 16 pages.

Sadeghi, "802.11bd Specification Framework Document," IEEE P802.11 Wireless LANs, doc.: IEEE 802.11-19/0497r5, Mar. 2019, 9 pages.

"Fact Sheet, Use of the 5.850-5.925 GHz Band," Notice of Proposed Rulemaking—ET Docket No. 19-138, Federal Communications Commission, FCC-CIRC1912-YY, Nov. 21, 2019, 50 pages.

IEEE P802.11ax™/D6.0, "Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 1: Enhancements for High Efficiency WLAN," Nov. 2019, 780 pages.

IEEE Std. 802.11™-2016, "IEEE Standard for Information technology—Telecommunications and information exchange between systemsLocal and metropolitan area networks—Specific requirements, Part 11: Wireless LAN Medium Access Control (MAC) and Physical Layer (PHY) Specifications," Prepared by the 802.11 Working Group of the LAN/MAN Standards Committee of the IEEE Computer Society , Approved Dec. 7, 2016, 3,534 pages.

Japanese Notice of Reasons for Rejection and English Translation, Japanese Application No. 2022-555997, mailed Jan. 23, 2024, 10 pages.

Miguel López, et al., "Midamble Design", IEEE 802.11-20/0682r0, Apr. 29, 2020, 24 pages.

Chinese Office Action, Chinese Patent Application No. 202080098694.0, mailed May 11, 2024, 8 pages.

3rd Generation Partnership Project (3GPP), Technical Specification Group, Radio Access Network (RAN), 1.28Mcps UTRA TDD Physical Layer, 3G TR25.928 V0.0.2, R1-00-0423, Mar. 2003, 25 pages.

* cited by examiner

TRANSMISSION AND RECEPTION OF A PHYSICAL LAYER PACKET WITH MIDAMBLES

CROSS REFERENCE TO RELATED APPLICATIONS

This application is a continuation of U.S. patent application Ser. No. 17/911,951, filed on Sep. 15, 2022, which is a 35 U.S.C. § 371 national stage application of PCT International Application No. PCT/EP2020/057456 filed on Mar. 18, 2020, the disclosures and content of which are incorporated by reference herein in their entireties.

TECHNICAL FIELD

The present disclosure relates generally to the field of wireless communication. More particularly, it relates to transmission and reception of a physical layer packet comprising midambles.

BACKGROUND

A midamble may be defined as a non-data-carrying symbol block inserted in the data-carrying part of a physical layer packet.

For example, midambles may be useful to support channel estimation in scenarios where the channel is varying substantially over a duration of the physical layer packet (i.e., when a single channel estimation instance-such as a preamble-per physical layer packet is not sufficient for adequate channel estimation).

Therefore, there is a need for approaches to transmission and reception of a physical layer packet comprising midambles.

SUMMARY

It should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

It is an object of some embodiments to solve or mitigate, alleviate, or eliminate at least some disadvantages associated with transmission and/or reception of a physical layer packet comprising midambles.

A first aspect is a method of a transmitter configured to transmit a physical layer packet having a plurality of midambles. The method comprises applying a respective phase shift for each midamble of the physical layer packet, and transmitting the physical layer packet. The respective phase shift is from a sequence of phase shifts having random, or pseudo-random, character, and the respective phase shift is applied to at least a portion of symbols of the midamble.

In some embodiments, the portion of symbols comprises all symbols of the midamble, or all non-pilot symbols of the midamble, or all symbols of the midamble which are purposed for channel estimation.

In some embodiments, the sequence of phase shifts has a zero phase average value.

In some embodiments, the sequence of phase shifts consists of phase shifts of 0 radians and $\pi$ radians, represented by scaling values 1 and −1, respectively.

In some embodiments, applying a phase shift to a symbol comprises multiplying the symbol value by the scaling value representing the phase shift.

In some embodiments, the sequence of phase shifts is pre-defined or generated using a pre-defined algorithm.

In some embodiments, the physical layer packet is for multiple-input multiple-output (MIMO) transmission via a plurality of two or more spatial streams, each midamble comprises at least a corresponding plurality of training parts, and the same respective phase shift is applied to all training parts of a midamble.

In some embodiments, the plurality of midambles may comprise a plurality of periodically occurring midambles.

In some embodiments, applying a respective phase shift is responsive to an occurrence period of the midambles being shorter than a threshold value.

A second aspect is a method of a receiver configured to receive a physical layer packet having a plurality of midambles. The method comprises receiving the physical layer packet, and counteracting a respective phase shift for each midamble of the physical layer packet. The respective phase shift is from a sequence of phase shifts having random, or pseudo-random, character, and counteracting the respective phase shift comprises applying an opposite of the respective phase shift to at least a portion of symbols of the midamble or compensating the respective phase shift for at least a portion of symbols of the midamble.

In some embodiments, the portion of symbols comprises symbols of the midamble for which the respective phase shift was applied by a transmitter of the physical layer packet.

In some embodiments, the sequence of phase shifts consists of phase shifts of 0 radians and $\pi$ radians, represented by scaling values 1 and −1, respectively.

In some embodiments, applying an opposite of a phase shift to a symbol comprises multiplying the symbol value by the scaling value representing the phase shift.

In some embodiments, the sequence of phase shifts is pre-defined or generated using a pre-defined algorithm.

In some embodiments, the method further comprises acquiring the sequence of phase shifts. In some embodiments, acquiring the sequence of phase shifts comprises one or more of: receiving a signal indicative of the sequence of phase shifts, reading the sequence of phase shifts from a memory of the receiver, generating the sequence of phase shifts using a pre-defined algorithm, and detecting the sequence of phase shifts based on the received physical layer packet.

In some embodiments, the plurality of midambles may comprise a plurality of periodically occurring midambles.

A third aspect is a computer program product comprising a non-transitory computer readable medium, having thereon a computer program comprising program instructions. The computer program is loadable into a data processing unit and configured to cause execution of the method according to any of the first and second aspects when the computer program is run by the data processing unit.

A fourth aspect is an apparatus for a transmitter configured to transmit a physical layer packet having a plurality of midambles. The apparatus comprises controlling circuitry configured to cause application of a respective phase shift for each midamble of the physical layer packet, and transmission of the physical layer packet. The respective phase shift is from a sequence of phase shifts having random, or pseudo-random, character, and application of the respective phase shift is to at least a portion of symbols of the midamble.

A fifth aspect is an apparatus for a receiver configured to receive a physical layer packet having a plurality of midambles. The apparatus comprises controlling circuitry configured to cause reception of the physical layer packet, and counteraction of a respective phase shift for each midamble of the physical layer packet. The respective phase shift is from a sequence of phase shifts having random, or pseudo-random, character, and counteraction of the respective phase shift comprises application of an opposite of the respective phase shift to at least a portion of symbols of the midamble or compensation of the respective phase shift for at least a portion of symbols of the midamble.

A sixth aspect is a communication transmitter comprising the apparatus of the fourth aspect. A seventh aspect is a communication receiver comprising the apparatus of the fifth aspect.

An eighth aspect is a communication device comprising one or more of: the apparatus of the fourth aspect, the apparatus of the fifth aspect, the transmitter of the sixth aspect, and the receiver of the seventh aspect.

A ninth aspect is vehicle comprising the communication device of the eighth aspect.

In some embodiments, any of the above aspects may additionally have features identical with or corresponding to any of the various features as explained above for any of the other aspects.

An advantage of some embodiments is that spectral lines associated with the midambles of the physical layer packet are mitigated (e.g., suppressed).

An advantage of some embodiments is that higher output power may be possible compared to prior art approaches, while fulfilling spectrum requirements.

An advantage of some embodiments is that less interference may be caused to other users.

An advantage of some embodiments is that more relaxed requirements on the transmission filter may be applied than in prior art approaches.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

Figure 1:
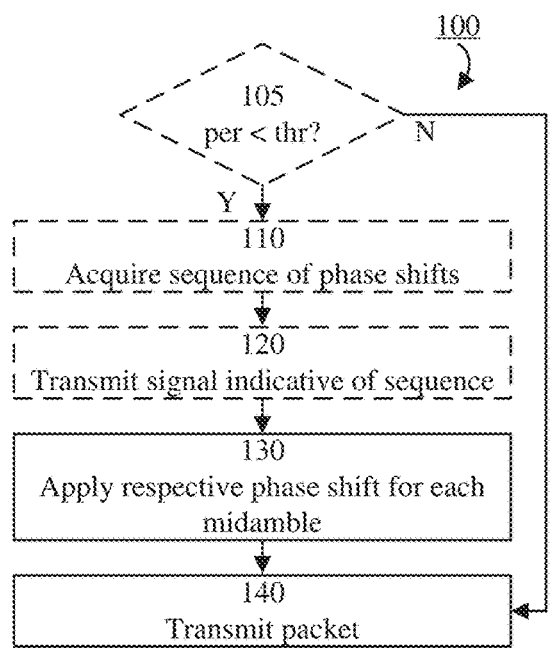
FIG. 1 is a flowchart illustrating example method steps according to some embodiments.

As already mentioned above, it should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

In some communication applications, a plurality of midambles are inserted in a physical layer packet such that spectral lines appear in the power spectrum of the physical layer packet when some of the midamble symbols coincide for different midambles (e.g., when the midambles comprises a same training sequence). In the following, the case of periodically occurring midambles will be considered as an example. It should be noted, however, that a similar problem of spectral lines appearing in the power spectrum of the physical layer packet may be experienced for non-periodically occurring midambles.

Generally, the plurality of midambles may comprise a plurality of periodically occurring midambles, or a plurality of non-periodically occurring midambles, or a first plurality of periodically occurring midambles and a second plurality of non-periodically occurring midambles.

In some communication applications, a plurality of midambles are inserted in a physical layer packet at equal distance from each other (e.g., separated by the same number of data-carrying symbols). When at least some of the midamble symbols coincide for different midambles, this approach may cause spectral lines to appear in the power spectrum of the physical layer packet (due to the periodic repetition of symbols).

Such spectral lines may be undesired. For example, they may be problematic in relation to fulfillment of spectrum masks and/or other frequency requirements (e.g., regarding Power Spectral Density (PSD) and/or out of band emissions). Therefore, there is a need for approaches to transmission and reception of a physical layer packet comprising midambles, wherein spectral lines are mitigated (e.g., suppressed).

In the following, embodiments will be described where a physical layer packet comprising midambles is processed by applying a respective phase shift for each midamble of the physical layer packet, wherein the respective phase shift is from a sequence of phase shifts having random, or pseudo-random, character. This results in that spectral lines associated with the midambles of the physical layer packet are mitigated.

In a particular application, the physical layer packet is a physical layer protocol data unit (PPDU) of an IEEE 802.11 standard (e.g., directed to vehicle-to-everything, V2X, communication) comprising constituent parts in the form of long training fields (LTF:s). However, it should be understood that embodiments are not limited thereto.

FIG. 1 illustrates an example method 100 according to some embodiments. The method is for a transmitter configured to transmit a physical layer packet having a plurality of (e.g., periodically occurring) midambles. Typically, at least some symbol values are the same from midamble to midamble, which causes undesired spectrum lines.

For example, the midambles may be for channel estimation in scenarios where the channel is varying substantially over a duration of the physical layer packet (e.g., in scenarios with substantial Doppler effect, such as high speed scenarios).

In step 130, a respective phase shift is applied for each midamble of the physical layer packet, and in step 140, the physical layer packet is transmitted.

The respective phase shift is applied to at least a portion of symbols of the midamble in step 130. In some embodiments, the portion of symbols comprises (e.g., consists of) all symbols of the midamble. In some embodiments, the portion of symbols comprises (e.g., consists of) all symbols of a constituent part of the midamble. In some embodiments, the portion of symbols comprises (e.g., consists of) all non-pilot symbols of the midamble. In some embodiments, the portion of symbols comprises (e.g., consists of) all symbols of the midamble which are purposed for channel estimation (e.g., training symbols, or other reference symbols).

The sequence of phase shifts may be pre-defined according to some embodiments. For example, a sequence or an indexed collection of sequences may be predefined (e.g., in accordance with a standard).

Alternatively or additionally, the sequence of phase shifts may be generated using a pre-defined algorithm. For example, an algorithm and/or one or more seed values may be predefined (e.g., in accordance with a standard).

In optional step 110, the sequence of phase shifts is acquired.

Acquisition of the sequence of phase shifts may, for example, comprise receiving a signal indicative of the sequence of phase shifts; e.g., from another communication node such as a network node or a receiver of the physical layer packet. The signal indicative of the sequence of phase shifts may, for example, comprise one or more of: the sequence, a sequence index, an algorithm identifier, an algorithm seed value, or an algorithm seed value index.

Alternatively or additionally, acquisition of the sequence of phase shifts may comprise reading the sequence of phase shifts from a memory of the transmitter; e.g., based on a sequence index when there are two or more sequences of phase shifts in the memory.

Yet alternatively or additionally, acquisition of the sequence of phase shifts may comprise generating the sequence of phase shifts using a pre-defined algorithm; e.g., based on an algorithm seed value.

In optional step 120, a signal indicative of the sequence of phase shifts is transmitted to a receiver of the physical layer packet. For example, the signal indicative of the sequence of phase shifts may, for example, comprise one or more of: the sequence, a sequence index, an algorithm identifier, an algorithm seed value, or an algorithm seed value index.

Optional step 105 illustrates that applying the respective phase shift may be responsive to an occurrence period (per) of the midambles being shorter than a threshold value (thr). Thus, if it is determined that the occurrence period of the midambles is shorter than a threshold value (Y-path out of step 105), the method is executed as described above. Otherwise (N-path out of step 105), the method proceeds directly to step 140 where the physical layer packet is transmitted without application of the phase shifts.

Figure 2:
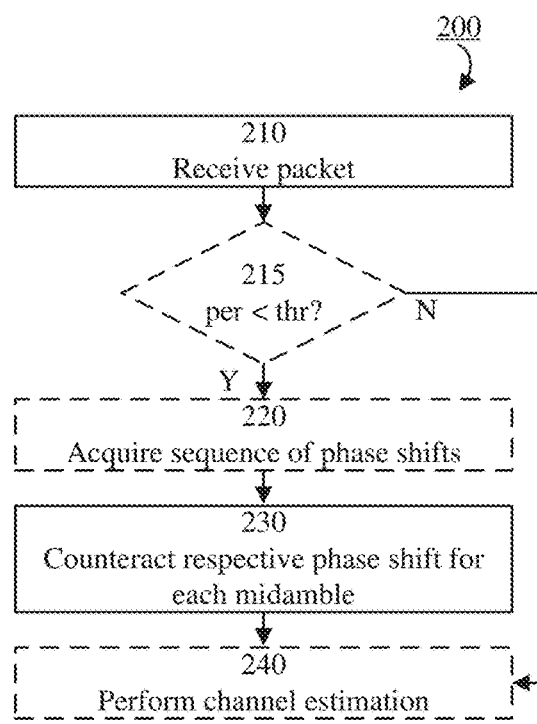
FIG. 2 is a flowchart illustrating example method steps according to some embodiments.

FIG. 2 illustrates an example method 200 according to some embodiments. The method is for a receiver configured to receive a physical layer packet having a plurality of (e.g., periodically occurring) midambles. Typically, at least some symbol values are the same from midamble to midamble, which-using prior art approaches-causes undesired spectrum lines.

For example, the midambles may be for channel estimation in scenarios where the channel is varying substantially over a duration of the physical layer packet (e.g., in scenarios with substantial Doppler effect, such as high speed scenarios).

In step 210, the physical layer packet is received, and in step 230, a respective phase shift for each midamble of the physical layer packet is counteracted.

Generally, counteracting a respective phase shift may be defined as applying an opposite to the respective phase shift (reverting the respective phase shift). Thus, counteracting the respective phase shift in step 230 may comprise applying an opposite of the respective phase shift (e.g., applying a phase shift which has the same phase magnitude as the respective phase shift, but opposite phase direction—i.e., sign—compared to the respective phase shift) to at least a portion of symbols of the midamble. Alternatively or additionally, counteracting a respective phase shift may be defined as compensating the respective phase shift for at least a portion of symbols of the midamble without explicitly reverting the respective phase shift. For example, a receiver processing step (e.g., channel estimation) may take the respective phase shift into account without explicitly reverting the respective phase shift.

In some embodiments, the portion of symbols comprises (e.g., consists of) all symbols of the midamble. In some embodiments, the portion of symbols comprises (e.g., consists of) all symbols of a constituent part of the midamble. In some embodiments, the portion of symbols comprises (e.g., consists of) all non-pilot symbols of the midamble. In some embodiments, the portion of symbols comprises (e.g., consists of) all symbols of the midamble which are purposed for channel estimation (e.g., training symbols, or other reference symbols).

The portion of symbols may typically comprise symbols of the midamble for which the respective phase shift was applied by a transmitter of the physical layer packet. Information regarding which symbols has a phase shift applied may, for example, be pre-defined or (implicitly or explicitly) indicated in a preamble of the physical layer packet.

It should be noted, however, that other approaches are also possible. For example, when the respective phase shift was applied to all symbols of the midamble by the transmitter, the receiver may apply an opposite of the respective phase shift only to symbols of the midamble purposed for channel estimation and/or non-pilot symbols of the midamble. Correspondingly, when the respective phase shift was applied only to symbols of the midamble purposed for channel estimation and/or non-pilot symbols of the midamble by the transmitter, the receiver may apply an opposite of the respective phase shift to all symbols of the midamble.

The sequence of phase shifts may be pre-defined according to some embodiments. For example, a sequence or an indexed collection of sequences may be predefined (e.g., in accordance with a standard).

Alternatively or additionally, the sequence of phase shifts may be generated using a pre-defined algorithm. For example, an algorithm and/or one or more seed values may be predefined (e.g., in accordance with a standard).

In optional step 220, the sequence of phase shifts is acquired.

Acquisition of the sequence of phase shifts may, for example, comprise receiving a signal indicative of the sequence of phase shifts; e.g., from another communication node such as a network node or a transmitter of the physical layer packet (compare with step 120 illustrated in FIG. 1). The signal indicative of the sequence of phase shifts may, for example, comprise one or more of: the sequence, a sequence index, an algorithm identifier, an algorithm seed value, or an algorithm seed value index.

Alternatively or additionally, acquisition of the sequence of phase shifts may comprise reading the sequence of phase shifts from a memory of the receiver; e.g., based on a sequence index when there are two or more sequences of phase shifts in the memory.

Yet alternatively or additionally, acquisition of the sequence of phase shifts may comprise generating the sequence of phase shifts using a pre-defined algorithm; e.g., based on an algorithm seed value.

Further alternatively or additionally, acquisition of the sequence of phase shifts may comprise detecting the sequence of phase shifts based on the received physical layer packet. For example, when a previous channel estimate is known (e.g., from the preamble or a previous midamble) such knowledge may be used to estimate a phase shift for subsequent midamble(s).

For example, the phase of each subcarrier for the LTF(s) in the preamble can be compared to the phase of the corresponding subcarrier in the first LTF in the midamble. The phase difference for each subcarrier can be determined, and the phase shift of the first midamble with respect to the LTF(s) in the preamble may be estimated by averaging over subcarriers. The process can be continued by comparing the phase of each subcarrier for the first midamble to the phase of the corresponding subcarrier in the second midamble in the same way to estimate the phase shift of the second midamble with respect to the first midamble; and so on.

Optional step 215 illustrates that counteracting the respective phase shift may be responsive to an occurrence period (per) of the midambles being shorter than a threshold value (thr). Thus, if it is determined that the occurrence period of the midambles is shorter than a threshold value (Y-path out of step 215), the method is executed as described above. Otherwise (N-path out of step 215), the received physical layer packet is processed without phase shift counteraction.

In any case processing of the received physical layer packet may include performing channel estimation based on the midambles, as illustrated by optional step 240. When counteracting the respective phase shift comprises compensating for the respective phase shift during channel estimation, step 230 may be seen as a substep to step 240.

It should be noted that some of the steps of FIGS. 1 and 2 may be performed in another order than illustrated according to some embodiments. Some examples include step 110 and/or 120 being performed only once for a plurality of physical layer packets, step 220 being performed before step 215 and/or before step 210, and step 220 being performed only once for a plurality of physical layer packets.

Generally, the respective phase shifts are from a sequence of phase shifts having random, or pseudo-random, character.

For example, the respective phase shifts for a sequence of midambles may be selected in the order of appearance in the (pseudo)random sequence of phase shifts; i.e., two consecutive midambles are associated with two consecutive phase shifts in the (pseudo)random sequence of phase shifts.

In some embodiments, scrambling may be applied to the sequence of phase shifts and/or to the respective phase shifts of a physical layer packet; to prevent that a large number of consecutive same-valued phase shifts are applied to a physical layer packet.

That a sequence of phase shifts has random, or pseudo-random, character may be defined according to any suitable stochastic definition. Furthermore, the sequence may be provided using any suitable algorithm or other approach.

For example, the sequence of phase shifts may have a zero phase average value. Alternatively, the sequence of phase shifts may have a phase average value which is close to zero; e.g., within an absolute phase difference to zero phase which is lower than a phase threshold value. Yet alternatively, the sequence of phase shifts may have any suitable phase average value.

The phase average value of the sequence of phase shifts may be in the context of a phase shift space defined as $[-\pi, \pi]$ radians. For example, that the sequence of phase shifts has a zero phase average value may be in the context of a phase shift space defined as $[-\pi, \pi]$ radians, wherein half of the instances with a value of $\pi$ radians are counted as instances with a value of $-\pi$ radians, and vice versa.

Generally, the respective phase shifts applied for a single physical layer packet may have the same, or a different, phase average value than the sequence of phase shifts from which the respective phase shifts are taken.

In some embodiments, the sequence of phase shifts consists of phase shifts of 0 radians (0°) and $\pi$ radians (180°). Such phase shifts may be represented by scaling values 1 and −1, respectively. The latter is particularly suitable when the modulation scheme used for communication is such that a multiplication with −1 corresponds to a phase shift of $\pi$ radians (e.g.; phase shift keying, PSK, particularly binary phase shift keying, BPSK; quadrature amplitude modulation, QAM; etc.). Then, applying a phase shift to a symbol may comprise multiplying the symbol value by the scaling value representing the phase shift, and applying an opposite of a phase shift to a symbol may also comprise multiplying the symbol value by the scaling value representing the phase shift (since two multiplication with −1 cancel each other and multiplication with 1 is the identity operation).

In some embodiments, the sequence of phase shifts consists of phase shifts of 0 radians (0°), $\pi/2$ radians (90°), $\pi$ radians (180°), and $3\pi/2$ radians (270°). Such phase shifts may be represented by complex scaling values 1, i, −1, and −i respectively. The latter is particularly suitable when the modulation scheme used for communication is such that a multiplication with i corresponds to a phase shift of $\pi/2$ radians, a multiplication with −1 corresponds to a phase shift of $\pi$ radians, etc. (e.g., phase shift keying, PSK; quadrature amplitude modulation, QAM; etc.). Then, applying a phase shift to a symbol may comprise multiplying the symbol value by the scaling value representing the phase shift, and applying an opposite of a phase shift to a symbol may comprise multiplying the symbol value by the complex conjugate of the complex scaling value representing the phase shift.

In some embodiments, the sequence of phase shifts consists of selection from another set of phase shifts. The set of phase shifts may, for example, be distributed equidistantly in the interval [0,2π[radians.

Non-pilot symbols of a midamble may, for example, be understood in the context of IEEE 802.11 standards. Then, in each orthogonal frequency division multiplexing (OFDM) symbol, some of the subcarriers may be dedicated to pilot signals in order to make the coherent detection robust against frequency offsets and phase noise. Long training fields (LTF:s) are used for channel estimation and to improve the accuracy of frequency and time estimation. In the Very High Throughput (802.11ac), High Efficiency (802.11ax) and 802.11bd physical layers, the LTF:s allow for phase tracking by inserting pilot sub-carriers among the subcarriers dedicated to channel sounding. The OFDM symbols supporting channel sounding and comprising LTF:s contain both pilot and non-pilot subcarriers. Non-pilot symbols of the midamble may then refer to the part(s) of a midamble which correspond to non-pilot subcarriers.

Generally, non-pilot symbols of a midamble may refer to any part(s) of a midamble, whose function is not affected by a phase randomization. For such part(s) of the midamble, the respective phase shift may be applied for transmission while not counteracted for reception, or the respective phase shift may be applied for transmission and counteracted for reception, or the respective phase shift may be un-applied for transmission and yet counteracted for reception, or the respective phase shift may be un-applied for transmission and not counteracted for reception.

Figure 3:
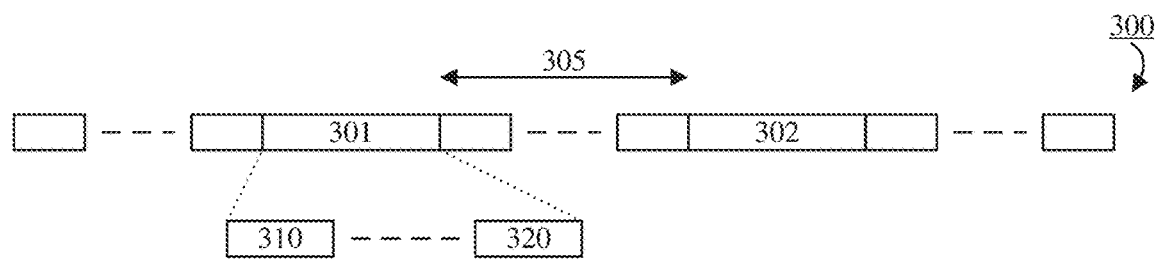
FIG. 3 is a schematic drawing illustrating an example physical layer packet according to some embodiments.

FIG. 3 schematically illustrates an example physical layer packet 300 according to some embodiments. A plurality of midambles 301, 302 are inserted in the physical layer packet (e.g., at equal distance from each other—separated by the same number of data-carrying symbols as indicated by 305). Each midamble 301, 302 may comprise one or more (typically identical) constituent parts 310, 320; e.g., a sequence of training symbols or similar.

When the physical layer packet is for multiple-input multiple-output (MIMO) transmission via a plurality of two or more spatial streams, each midamble may comprise (at least) a corresponding plurality of constituent parts (e.g., training parts). For example, in a MIMO application with two spatial streams, each midamble may comprise two constituent parts.

In a particular application, the physical layer packet is a physical layer protocol data unit (PPDU) of an IEEE 802.11 standard (e.g., directed to vehicle-to-everything, V2X, communication), the constituent parts of the midamble are long training fields (LTF:s), and some embodiments aim at mitigating (e.g., suppressing) spectral lines of the power spectral density (PSD) of the PPDU signal which are due to the repetition of LTF:s within and/or between the midambles.

Figure 4:
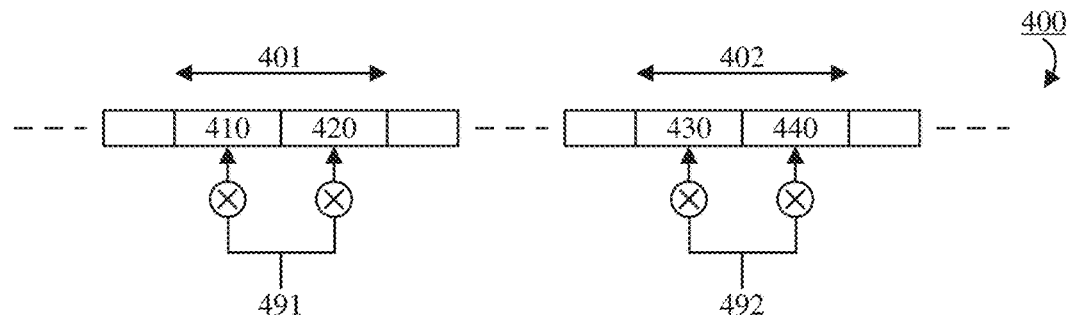
FIG. 4 is a schematic drawing illustrating example phase shifts for a physical layer packet according to some embodiments.

FIG. 4 schematically illustrates an example physical layer packet (e.g., a PPDU) 400 according to some embodiments. A plurality of midambles 401, 402 are inserted in the physical layer packet (e.g., at equal distance from each other). Each midamble 401, 402 comprises two constituent parts 410, 420; 430, 440 (e.g., LTF:s).

Also shown is application/counteraction of the respective phase shifts 491, 492 by multiplication with a scaling value. In this example, the respective phase shift is used for an entire midamble. Thus, the original phase difference between constituent parts of the same midamble is preserved, which may be particularly beneficial in MIMO applications, since different constituent parts of a midamble are used for channel estimation in relation to a respective spatial stream.

A particular example application of some embodiments will be described.

The current IEEE 802.11 technology for V2X applications is based on the IEEE 802.11p-2010 amendment, which in turn was derived from the IEEE 802.11a-1999 orthogonal frequency division multiplexing (OFDM) physical layer (PHY). There are ongoing activities in the IEEE 802.11bd Task Group to provide support for higher throughput and range in IEEE 802.11-based V2X applications, by adopting IEEE 802.11 technologies that are more modern than IEEE 802.11a.

The IEEE 802.11ax amendment introduced so-called midambles to better support channel estimation in propagation environments with high Doppler. A midamble may, at least in this context, be seen as a group of one or more Long Training Fields (LTF) that are inserted periodically (e.g., separated by $M_{MA}$ data field symbols) in the Physical layer Protocol Data Unit (PPDU) in order to facilitate updates to the channel estimates (compare with FIGS. 3 and 4). For example, for IEEE 802.11ax each midamble may comprise a number of high efficiency (HE) LTF:s, each of which is identical to the HE-LTF of the PPDU preamble.

Since high Doppler is typical in V2X communications, IEEE 802.11bd is considering the adoption of midambles. Moreover, IEEE 802.11bd proposes to shorten the periodicity of the midambles with respect to IEEE 802.11ax. It seems like the number $M_{MA}$ of data symbols between a pair of midambles could be as low as four (i.e., $M_{MA} \geq 4$).

In addition, IEEE 802.11bd is considering the adoption of MIMO with up to two spatial streams in order to increase throughput. If both MIMO and midambles are employed, then each midamble typically comprises (at least) two LTFs.

When the midamble period is short (e.g., when $M_{MA}=4$), spikes appear in the spectrum. The reason is that the LTF:s in the midambles are repeated, which creates strong periodic time correlations. These correlations give rise to spectral lines, which are spikes in the Power Spectral Density (PSD) of the PPDU. The PSD of an IEEE 802.11bd PPDU is illustrated in FIGS. 5 and 6.

Figure 5:
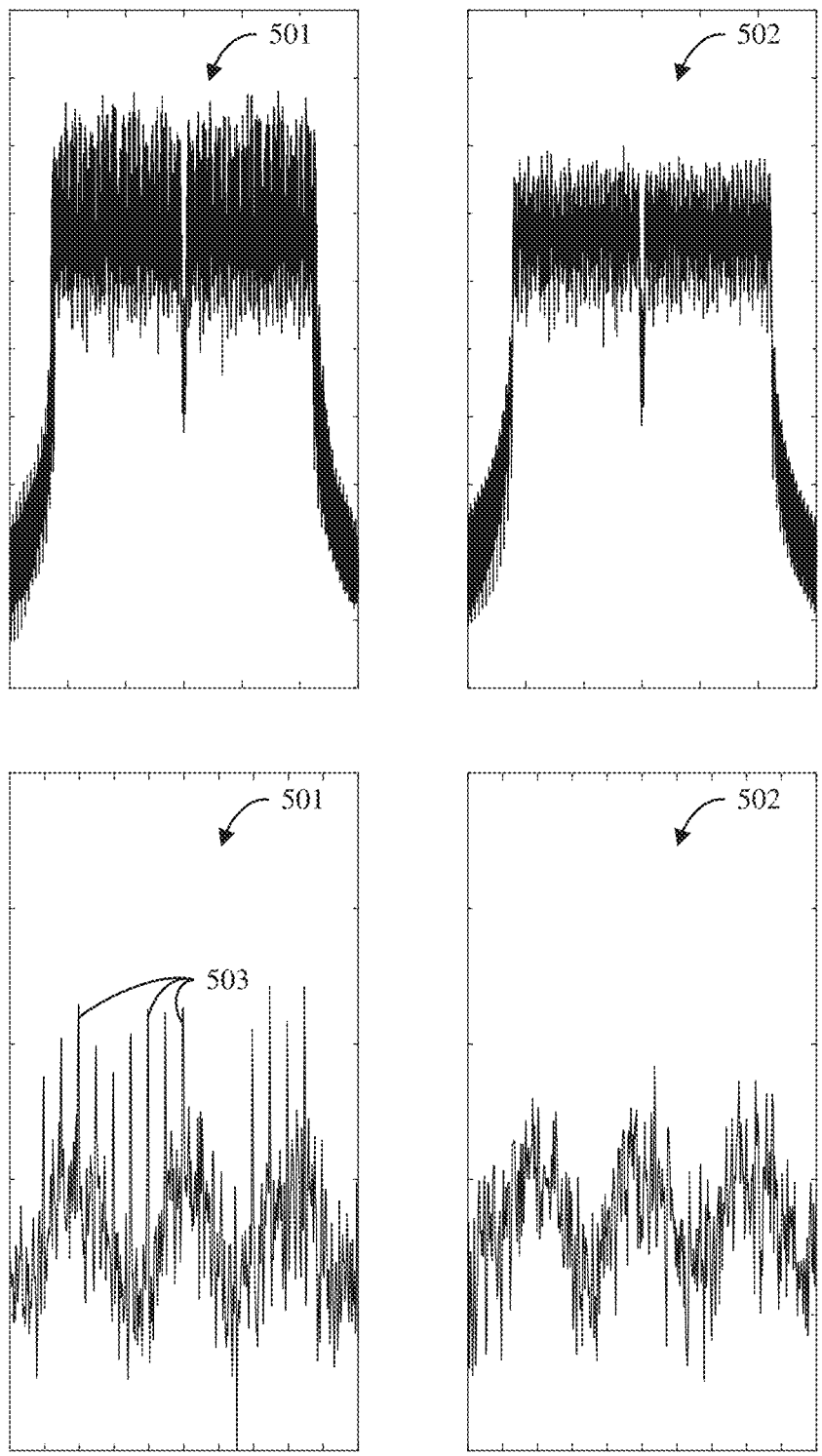
FIG. 5 is a collection of simulation plots illustrating example power spectrum densities relevant to some embodiments.
Figure 6:
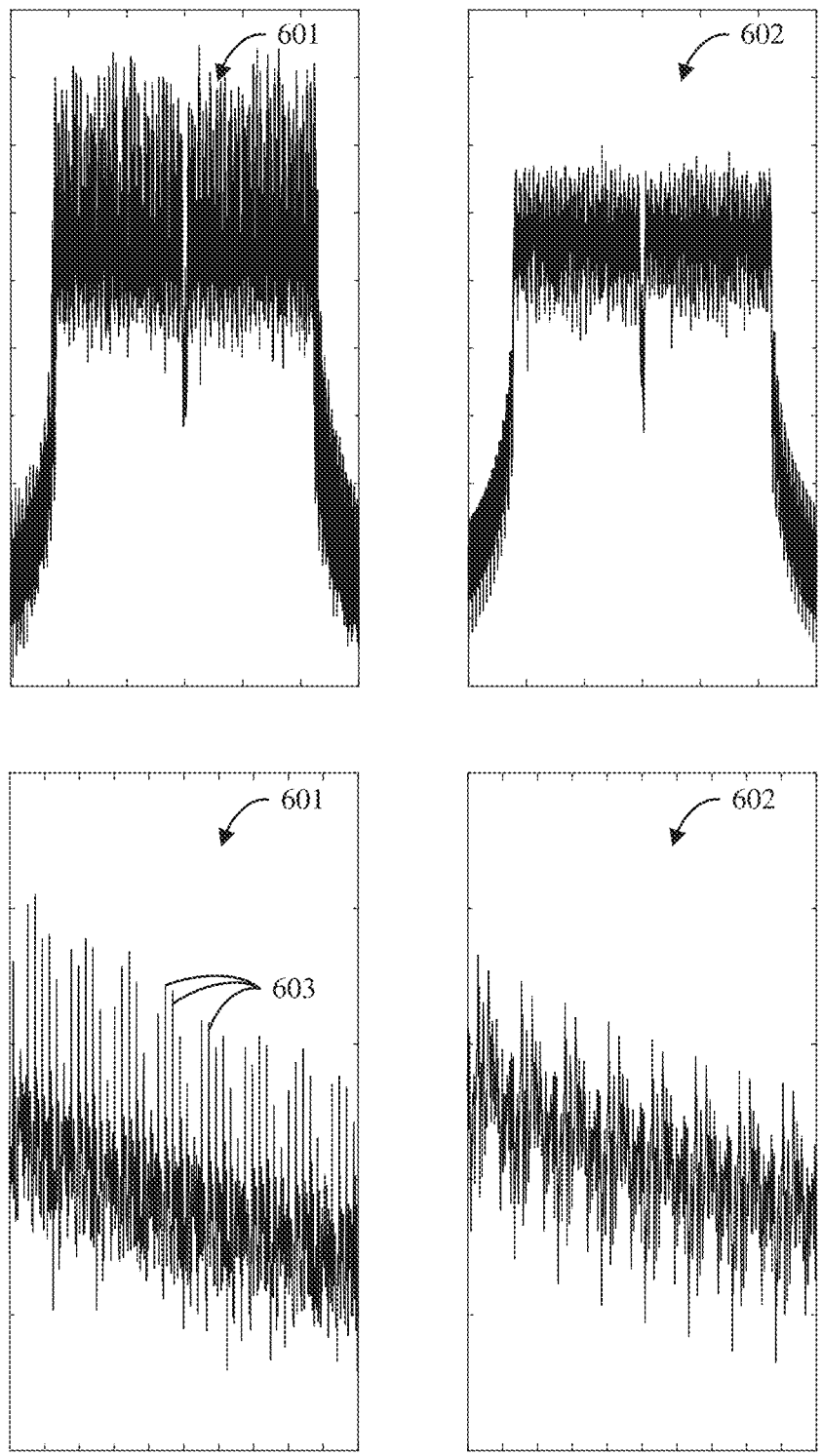
FIG. 6 is a collection of simulation plots illustrating example power spectrum densities relevant to some embodiments.

FIG. 5 illustrates the PSD of an IEEE 802.11bd PPDU with one spatial stream.

In the upper plots, the y-axes represents the PSD ranging from −40 dB to 10 dB and the x-axes represents a frequency interval of approximately 12 MHz. The left plot is the PSD 501 for a PPDU with midambles ($M_{MA}=4$) and the right plot is the PSD 502 for a PPDU without midambles.

In the lower plots (which represent zoomed in versions of the upper plots), the y-axes represents the PSD ranging from −15 dB to 10 dB and the x-axes represents a frequency interval of approximately 0.5 MHz. The spectral lines resulting from the midambles can be seen in the left plot and some of them are indicated by 503.

FIG. 6 illustrates the PSD of an IEEE 802.11bd PPDU with two spatial streams, wherein the PSD shown corresponds to the output signal from one of the transmit chains.

In the upper plots, the y-axes represents the PSD ranging from −40 dB to 10 dB and the x-axes represents a frequency interval of approximately 12 MHz. The left plot is the PSD 601 for a PPDU with midambles ($M_{MA}=4$) and the right plot is the PSD 602 for a PPDU without midambles.

In the lower plots (which represent zoomed in versions of the upper plots), the y-axes represents the PSD ranging from −40 dB to −15 dB and the x-axes represents a frequency interval of approximately 1 MHz. The spectral lines resulting from the midambles can be seen in the left plot and some of them are indicated by 603.

As can be seen in FIGS. 5 and 6, the use of midambles introduces undesirable spikes (spectral lines) in the PSD, which may render it more difficult to fulfil one or more of spectrum mask requirements (e.g., requirements regarding leakage to adjacent channels) and PSD requirements (e.g., requirements regarding power emission per frequency unit). Thus, the undesirable spikes may result in enforced reduction of the total transmit power well below the maximum allowed limit.

Applying (pseudo)random phase shifts to the LTF in the midambles as exemplified in embodiments herein leads to that the randomization mitigates, or eliminates, the undesired spikes in the PSD of the IEEE 802.11bd PPDU.

Randomization of the transmitted waveform results in mitigation of the spectral lines, which can translate to one or more of higher output power, less interference to other users, and more relaxed requirements on the transmission filter.

As exemplified above, some embodiments proposes to impart (pseudo)random changes to the phase of the LTF:s comprised in the midambles.

In the case of a MIMO PPDU, the transmitter typically applies an orthogonal spreading code to the LTF:s in order to enable MIMO channel estimation at the receiver, and the changes to the phase of the LTF:s comprised in one midamble should preferably be the same to preserve the phase difference between LTF:s. Specifically, the spreading code may impart 0° or 180° phase shifts to consecutive LTF:s comprised in each midamble for MIMO, and these phase shifts may be important in order to obtain orthogonality in the spreading code and enable the receiver to estimate the channel. Hence, the randomization should preserve the relative phase shift between the different LTF:s for MIMO.

As mentioned before, the sequence of phase shifts may be generated as a pseudo-random sequence of phases.

One example sequence may be based on the IEEE 802.11-2016 Part 11 specification, which defines a pseudo-random sequence pn in Section 17.3.5.10. This sequence is a cyclic extension of the 127 elements in the sequence defined in Equation (17-25) of the specification, and is normally used to control the polarity of the pilot subcarriers.

One example sequence may be based on the data scrambler defined in Section 17.3.5.5 of the IEEE 802.11-2016 Part 11 specification, which generates scrambling sequences of logical bits that can be mapped to ±1.

Once a sequence of phase shifts is available, the LTF:s comprised in the n-th midamble may be multiplied by the same phase factor pn; e.g., the nth entry of the sequence of phase shifts (compare with FIG. 4). Such an approach preserves the relative phase between consecutive LTF:s in the same midamble.

Figure 7:
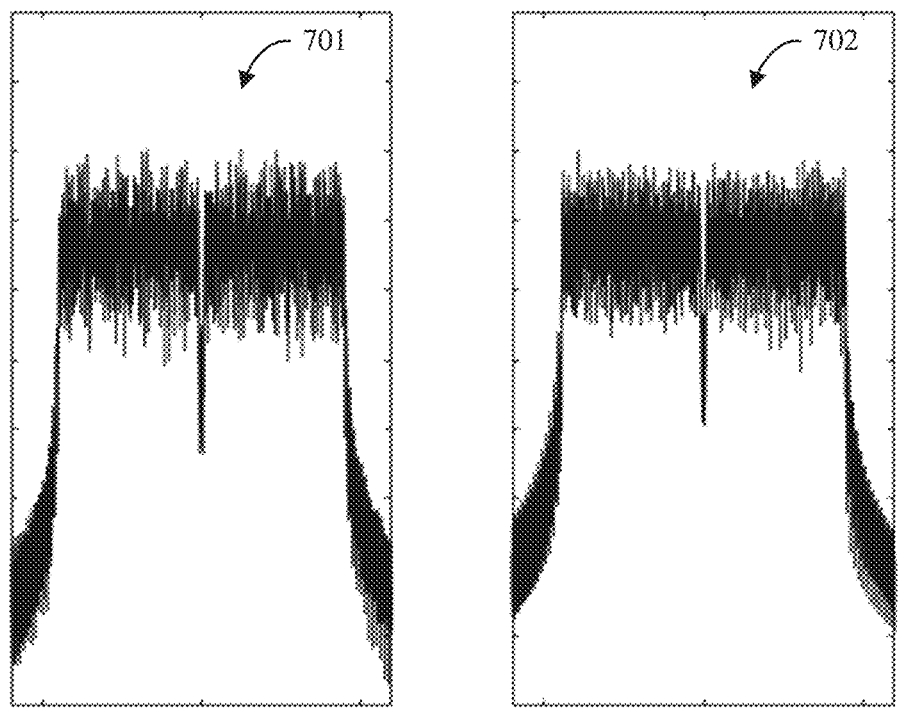
FIG. 7 is a collection of simulation plots illustrating example power spectrum densities relevant to some embodiments.

FIG. 7 (which should be compared to FIG. 6) illustrates the PSD of an IEEE 802.11bd PPDU with two spatial streams, wherein the PSD shown corresponds to the output signal from one of the transmit chains.

The y-axes represents the PSD ranging from −40 dB to 10 dB and the x-axes represents a frequency interval of approximately 12 MHz. The left plot is the PSD 701 for a PPDU with midambles ($M_{MA}=4$) after application of randomization as explained above (see also FIG. 4) and the right plot is the PSD 702 for a PPDU without midambles. As apparent from FIG. 7, the spectral lines resulting from the midambles seen in the left plot of FIG. 6 are no longer present; or at least less prominent than in FIG. 6.

If the periodicity is large enough, the impact on the PSD of the repeated midambles is less pronounced and might be neglected. Hence, midamble randomization as exemplified herein might be applied only if the periodicity is under a threshold (e.g., defined in terms of a value of $M_{MA}$, for example $M_{MA}=16$).

Figure 8:
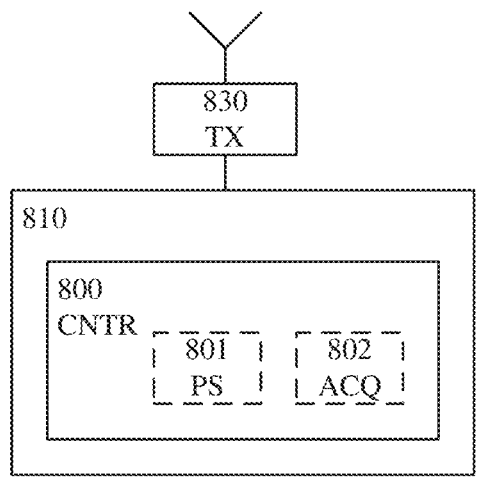
FIG. 8 is a schematic block diagram illustrating an example apparatus according to some embodiments.

FIG. 8 schematically illustrates an example apparatus 810 according to some embodiments. The apparatus 810 is for a transmitter configured to transmit a physical layer packet having a plurality of (e.g., periodically occurring) midambles. For example, the apparatus 810 may be configured to cause performance of (e.g., perform) one or more of the method steps described in connection to FIG. 1.

The apparatus may be comprised (or comprisable) in one or more of a (wireless) communication transmitter, a (wireless) communication device (e.g., a network node, access point, user equipment—UE, or station—STA), and a vehicle.

The apparatus comprises a controller (CNTR; e.g., controlling circuitry or a control module) 800.

The controller 800 is configured to cause application of a respective phase shift for each midamble of the physical layer packet (compare with step 130 of FIG. 1).

To this end, the controller 800 may comprise or be otherwise associated with (e.g., connected, or connectable, to) a phase shifter (PS; e.g., phase shifting circuitry or a phase shift module) 801. The phase shifter may be configured to apply the respective phase shift for each midamble of the physical layer packet. For example, the phase shifter may comprise one or more multipliers configured to multiply a symbol value by a scaling value representing the phase shift as elaborated on above.

The controller 800 is also configured to cause transmission of the physical layer packet (compare with step 140 of FIG. 1).

To this end, the controller 800 may comprise or be otherwise associated with (e.g., connected, or connectable, to) a transmitter (TX; e.g., transmitting circuitry or a transmitter module) 830. The transmitter may be configured to transmit the physical layer packet.

The controller 800 may also be configured to cause acquisition of the sequence of phase shifts (compare with step 110 of FIG. 1).

To this end, the controller 800 may comprise or be otherwise associated with (e.g., connected, or connectable, to) an acquirer (ACQ; e.g., acquisition circuitry or an acquisition module) 802. The acquirer may be configured to acquire the sequence of phase shifts as elaborated on above (e.g., via reception, memory read, and/or generation).

Figure 9:
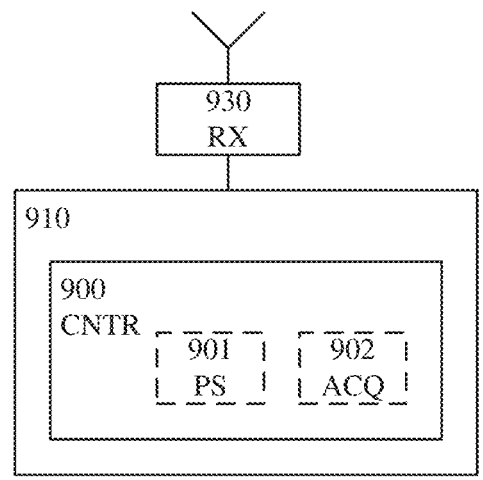
FIG. 9 is a schematic block diagram illustrating an example apparatus according to some embodiments.

FIG. 9 schematically illustrates an example apparatus 910 according to some embodiments. The apparatus 910 is for a receiver configured to receive a physical layer packet having a plurality of (e.g., periodically occurring) midambles. For example, the apparatus 910 may be configured to cause performance of (e.g., perform) one or more of the method steps described in connection to FIG. 2.

The apparatus may be comprised (or comprisable) in one or more of a (wireless) communication receiver, a (wireless) communication device (e.g., a network node, access point, user equipment—UE, or station—STA), and a vehicle.

The apparatus comprises a controller (CNTR; e.g., controlling circuitry or a control module) 900.

The controller 900 is configured to cause reception of the physical layer packet (compare with step 210 of FIG. 2).

To this end, the controller 900 may comprise or be otherwise associated with (e.g., connected, or connectable, to) a receiver (RX; e.g., receiving circuitry or a receiver module) 930. The receiver may be configured to receive the physical layer packet.

The controller 900 is configured to cause counteraction of a respective phase shift for each midamble of the physical layer packet (compare with step 230 of FIG. 2).

To this end, the controller 900 may comprise or be otherwise associated with (e.g., connected, or connectable, to) a phase shifter (PS; e.g., phase shifting circuitry or a phase shift module) 901. The phase shifter may be configured to revert the respective phase shift by applying an opposite of the respective phase shift for each midamble of the physical layer packet. For example, the phase shifter may comprise one or more multipliers configured to multiply a symbol value by a scaling value representing the opposite of the respective phase shift as elaborated on above.

The controller 900 may also be configured to cause acquisition of the sequence of phase shifts (compare with step 220 of FIG. 2).

To this end, the controller 900 may comprise or be otherwise associated with (e.g., connected, or connectable, to) an acquirer (ACQ; e.g., acquisition circuitry or an acquisition module) 902. The acquirer may be configured to acquire the sequence of phase shifts as elaborated on above (e.g., via reception, memory read, generation, and/or detection).

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a wireless communication device, a network node, or a vehicle.

Embodiments may appear within an electronic apparatus (such as a wireless communication device, a network node, or a vehicle) comprising arrangements, circuitry, and/or logic according to any of the embodiments described herein. Alternatively or additionally, an electronic apparatus (such as a wireless communication device, a network node, or a vehicle) may be configured to perform methods according to any of the embodiments described herein.

Figure 10:
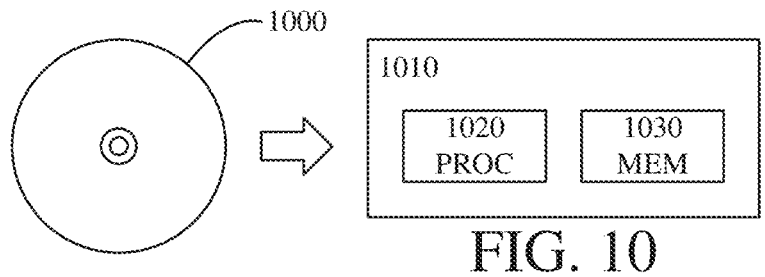
FIG. 10 is a schematic drawing illustrating an example computer readable medium according to some embodiments.

According to some embodiments, a computer program product comprises a tangible, or non-tangible, computer readable medium such as, for example a universal serial bus (USB) memory, a plug-in card, an embedded drive or a read only memory (ROM). FIG. 10 illustrates an example computer readable medium in the form of a compact disc (CD) ROM 1000. The computer readable medium has stored thereon a computer program comprising program instructions. The computer program is loadable into a data processor (PROC; e.g., data processing circuitry or a data processing unit) 1020, which may, for example, be comprised in a device 1010 (e.g., a wireless communication device, a network node, or a vehicle). When loaded into the data processor, the computer program may be stored in a memory (MEM) 1030 associated with or comprised in the data processor. According to some embodiments, the computer program may, when loaded into and run by the data processor, cause execution of method steps according to, for example, any of the methods illustrated in FIGS. 1 and 2, or otherwise described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

The invention claimed is:

1. A method of a transmitter configured to transmit a physical layer packet having a plurality of midambles, the method comprising:
applying a respective phase shift for each midamble of the physical layer packet, wherein the respective phase shift is from a sequence of phase shifts having random, or pseudo-random, character, and wherein the respective phase shift is applied to at least a portion of symbols of the midamble, wherein the sequence is a cyclic extension of elements in a sequence used to control polarity of pilot subcarriers of a training sequence provided by the transmitter, wherein the sequence of phase shifts consists of phase shifts of 0 radians and $\pi$ radians, represented by scaling values 1 and −1, respectively; and
transmitting the physical layer packet.

2. The method of claim 1, wherein the sequence of phase shifts has a zero phase average value.

3. The method of claim 1, wherein applying a phase shift to a symbol comprises multiplying a value of the symbol by the scaling value representing the phase shift.

4. The method of claim 1, wherein the plurality of midambles comprises a plurality of periodically occurring midambles.

5. A method of a receiver configured to receive a physical layer packet having a plurality of midambles, the method comprising:
receiving the physical layer packet; and counteracting a respective phase shift for each midamble of the physical layer packet, wherein the respective phase shift is from a sequence of phase shifts having random, or pseudo-random, character, and wherein counteracting the respective phase shift comprises applying an opposite of the respective phase shift to at least a portion of symbols of the midamble or compensating the respective phase shift for at least a portion of symbols of the midamble, wherein the sequence is a cyclic extension of elements in a sequence used to control polarity of pilot subcarriers of a training sequence received by the receiver, wherein the sequence of phase shifts consists of phase shifts of 0 radians and $\pi$ radians, represented by scaling values 1 and −1, respectively.

6. The method of claim 5, wherein applying an opposite of a phase shift to a symbol comprises multiplying a value of the symbol by the scaling value representing the phase shift.

7. The method of claim 5, further comprising acquiring the sequence of phase shifts.

8. The method of claim 7, wherein acquiring the sequence of phase shifts comprises one or more of:
receiving a signal indicative of the sequence of phase shifts;
reading the sequence of phase shifts from a memory of the receiver;
generating the sequence of phase shifts using a pre-defined algorithm; and
detecting the sequence of phase shifts based on the received physical layer packet.

9. The method of claim 5, wherein the plurality of midambles comprises a plurality of periodically occurring midambles.

10. An apparatus for a transmitter configured to transmit a physical layer packet having a plurality of midambles, the apparatus comprising controlling circuitry configured to cause:
application of a respective phase shift for each midamble of the physical layer packet, wherein the respective phase shift is from a sequence of phase shifts having random, or pseudo-random, character, and wherein application of the respective phase shift is to at least a portion of symbols of the midamble, wherein the sequence is a cyclic extension of elements in a sequence used to control polarity of pilot subcarriers of a training sequence provided by the transmitter, wherein the sequence of phase shifts consists of phase shifts of 0 radians and $\pi$ radians, represented by scaling values 1 and −1, respectively; and
transmission of the physical layer packet.

11. The apparatus of claim 10, wherein the sequence of phase shifts has a zero phase average value.

12. The apparatus of claim 10, wherein application of a phase shift to a symbol comprises multiplication of a value of the symbol by the scaling value representing the phase shift.

13. The apparatus of claim 10, wherein the plurality of midambles comprises a plurality of periodically occurring midambles.

14. The apparatus of claim 10, wherein the apparatus is a component of a communication transmitter.

15. An apparatus for a receiver configured to receive a physical layer packet having a plurality of midambles, the apparatus comprising controlling circuitry configured to cause:
reception of the physical layer packet; and
counteraction of a respective phase shift for each midamble of the physical layer packet, wherein the respective phase shift is from a sequence of phase shifts having random, or pseudo-random, character, and wherein counteraction of the respective phase shift comprises application of an opposite of the respective phase shift to at least a portion of symbols of the midamble or compensation of the respective phase shift for at least a portion of symbols of the midamble, wherein the sequence is a cyclic extension of elements in a sequence used to control polarity of pilot subcarriers of a training sequence received by the receiver, wherein the sequence of phase shifts consists of phase shifts of 0 radians and $\pi$ radians, represented by scaling values 1 and −1, respectively.

16. The apparatus of claim 15, wherein application of an opposite of a phase shift to a symbol comprises multiplication of a value of the symbol by the scaling value representing the phase shift.

17. The apparatus of claim 15, wherein the controlling circuitry is further configured to cause acquisition of the sequence of phase shifts.

18. The apparatus of claim 17, wherein acquisition of the sequence of phase shifts comprises one or more of:
reception of a signal indicative of the sequence of phase shifts;
reading of the sequence of phase shifts from a memory of the receiver;
generation of the sequence of phase shifts using a pre-defined algorithm; and
detection of the sequence of phase shifts based on the received physical layer packet.

19. The apparatus of claim 15, wherein the plurality of midambles comprises a plurality of periodically occurring midambles.

20. The apparatus of claim 15, wherein the apparatus is a component of a communication receiver.

21. A communication device comprising:
a first apparatus for a transmitter configured to transmit a first physical layer packet having a plurality of midambles, the apparatus comprising controlling circuitry configured to cause: application of a respective phase shift for each midamble of the first physical layer packet, wherein the respective phase shift is from a sequence of phase shifts having random, or pseudo-random, character, and wherein application of the respective phase shift is to at least a portion of symbols of the midamble, wherein the sequence is a cyclic extension of elements in a sequence used to control polarity of pilot subcarriers of a training sequence provided by the transmitter, wherein the sequence of phase shifts consists of phase shifts of 0 radians and $\pi$ radians, represented by scaling values 1 and −1, respectively; and transmission of the first physical layer packet; and
a second apparatus for a receiver configured to receive a second physical layer packet having a plurality of midambles, the apparatus comprising controlling circuitry configured to cause: reception of the second physical layer packet, and counteraction of a respective phase shift for each midamble of the second physical layer packet, wherein the respective phase shift is from a sequence of phase shifts having random, or pseudo-random, character, and wherein counteraction of the respective phase shift comprises application of an opposite of the respective phase shift to at least a portion of symbols of the midamble or compensation of the respective phase shift for at least a portion of symbols of the midamble, wherein the sequence is a cyclic extension of elements in a sequence used to control polarity of pilot subcarriers of a training sequence received by the receiver, wherein the sequence of phase shifts consists of phase shifts of 0 radians and $\pi$ radians, represented by scaling values 1 and −1, respectively.

22. The communication device of claim 21, wherein the communication device is a component of a vehicle.

\* \* \* \* \*